United States Patent [19]

Drews et al.

[11] Patent Number: 5,334,648
[45] Date of Patent: Aug. 2, 1994

[54] EMULSION POLYMERS FOR USE AS A UREA FORMALDEHYDE RESIN MODIFIER

[75] Inventors: Stephen F. Drews, N. Olmsted; Leo A. Tischer, Parma, both of Ohio

[73] Assignee: The B. F. Goodrich Company, Akron, Ohio

[21] Appl. No.: 69,641

[22] Filed: May 28, 1993

Related U.S. Application Data

[63] Continuation of Ser. No. 784,864, Oct. 30, 1991, abandoned.

[51] Int. Cl.⁵ .......................... C08J 3/00; C08K 3/00; C08L 61/00
[52] U.S. Cl. .......................... 524/512; 524/6; 524/7; 524/216; 525/239; 525/518; 525/519; 525/509; 525/154; 428/147; 428/278; 428/526
[58] Field of Search .......................... 524/6, 7, 216, 512; 525/239, 518, 519, 509, 154; 428/147, 278, 526

[56] References Cited

U.S. PATENT DOCUMENTS

| | | |
|---|---|---|
| 2,716,617 | 8/1955 | Austin et al. .......................... 428/526 |
| 3,682,871 | 8/1972 | Mikofalvy et al. . |
| 3,702,785 | 11/1972 | Knechtges et al. . |
| 3,748,295 | 7/1973 | Mikofalvy et al. . |
| 3,787,232 | 1/1974 | Mikofalvy et al. . |
| 4,623,462 | 11/1986 | Urig et al. .......................... 162/135 |
| 4,859,508 | 8/1989 | Pangrazi et al. . |

*Primary Examiner*—Paul R. Michl
*Assistant Examiner*—Patrick Niland
*Attorney, Agent, or Firm*—George W. Moxon, II

[57] ABSTRACT

Emulsion copolymers, for use as urea formaldehyde resin modifiers, are formed from vinyl chloride monomers, softening monomers, and functional monomers. The copolymer when blended with formaldehyde resins and used as a binder yields improved wet and dry tensile strength and better tear resistance. These binders are particularly useful as glass mat binders for the production of roofing shingles.

17 Claims, No Drawings

EMULSION POLYMERS FOR USE AS A UREA FORMALDEHYDE RESIN MODIFIER

This is a continuation of application Ser. No. 07/784,864, filed Oct. 30, 1991, now abandoned.

FIELD OF THE INVENTION

This invention relates to a copolymer formed from vinyl chloride monomers, softening monomers, and functional monomers. This copolymer when blended with urea formaldehyde resins forms a nonwoven binder that imparts improved wet and dry tensile strength. The present invention also relates to a binder formed from the copolymers and urea formaldehyde that has utility in roofing shingles.

BACKGROUND OF THE INVENTION

Glass mat binders made with urea formaldehyde are used in the production of roofing shingles. This invention utilizes a polymer blended with urea formaldehyde to form the glass mat binders. The polymer produced provides a unique combination of benefits over non-modified urea formaldehyde binders such as improved wet and dry tensile strength, better tear resistance, and the ability to run at higher line speeds during the production of roofing shingles.

U.S. Pat. No. 3,682,871 to Mikofalvy et al relates to copolymers of vinylidene halide monomers, olefinically unsaturated monocarboxylic acid monomers, N-alkylol amide monomers, and one or more other polymerizable comonomers as low curing vinylidene halideunsaturated monocarboxlic acid-N-alkylol amide polymers.

U.S. Pat. No. 3,702,785 to Knechtges et al relates to nonwoven fabrics, textiles, papers and other substrates treated with a polymer latex derived predominately from acrylic esters and/or vinyl esters that are curable at low temperatures.

U.S. Pat. No. 3,748,295 to Mikofalvy et al relates to aqueous dispersions of vinylidene halide polymers capable of being cured at low temperatures prepared by the emulsion polymerization of one or more vinylidene halide monomers with a carboxylic acid monomer and an N-alkylol amide monomer in an aqueous system.

U.S. Pat. No. 3,787,232 to Mikofalvy et al relates to vinylidene halide polymers capable of being cured at low temperatures, prepared by emulsion polymerization of one or more vinylidene halide monomers with a carboxylic acid monomer and an N-alkylol amide monomer in an aqueous system.

U.S. Pat. No. 4,859,508 to Pangrazi et al discloses heat resistant binders made using blocked and unblocked N-methylol containing monomers and does not suggest polyvinyl chloride or vinyl acetate.

SUMMARY OF THE INVENTION

According to the present invention, copolymers comprising vinyl chloride, softening monomers, and functional monomers are produced. These copolymers when blended with urea formaldehyde resins and used as binders for nonwoven glass mats demonstrate improved properties over those of unmodified formaldehyde resins or those modified with acrylic or SBR latex. The resins prepared according to this invention have particular utility as glass mat binders for roofing shingles.

DETAILED DESCRIPTION

The copolymers of the present invention are made from vinyl chloride monomer, softening monomers, and functional monomers. The vinyl chloride monomer of the present invention is generally well known to the art and to the literature.

The amount of vinyl chloride monomer polymerized in the copolymer of the present invention is generally from about 20 to about 90 percent by weight, desirably from about 35 to 70 percent by weight, and preferably from about 45 to 55 percent by weight.

The softening monomer generally functions to lower the Tg of the polymer so the polymer can flow during processing and provide flexibility to the finished goods. One group of softening agents includes the acrylates. Generally the acrylates have from 1 to 8 carbon atoms, desirably from about 2 to about 8 carbon atoms, and preferably 4 carbon atoms. Typical acrylates include ethyl acrylate, butyl acrylate and 2-ethyl-hexyl acrylate.

Another type of softening monomer includes the vinyl esters. Typical vinyl esters include vinyl propionate, vinyl acetate, and isopropenyl acetate with vinyl acetate being preferred. Other types of softening monomers include the olefins, particularly ethylene and propylene which may be used alone or in combination with acetate monomers. The acrylic esters have the following general formula:

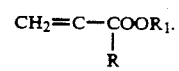

Vinyl esters can be represented by the following general formula:

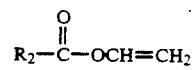

wherein R is a hydrogen or an alkyl radical containing from 1 to 4 carbon atoms, $R_1$ is a hydrocarbon radical containing from 1 to 12 carbon atoms such as alkyl, aryl, cycloalkyl, alkaryl or aralkyl radicals, and $R_2$ is an alkyl radical containing from 1 to 6 carbon atoms.

The amount of softening monomers is generally from about 9.5 to 72 percent by weight, desirably from 30 to 60 percent by weight, and preferably from about 40 to about 50 percent by weight. The preferred softening agents are butyl acrylate or vinyl acetate.

Another monomer is a functional monomer. Functional monomers are used to crosslink the vinyl polymer chain and react with the urea-formaldehyde. These functional monomers also have an impact on the interactional dynamics between the polymer and the U-F during the drying and curing stages of the binder. The functional monomers can generally be broken down into crosslinking monomers and other monomers. Typical functional crosslinking monomers have the general formula

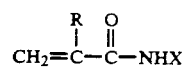

where R=H, $CH_3$ and X=$CH_2$—OH,

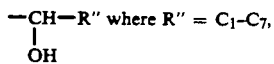 $CH_2-OR'$ where $R' = C_1-C_8$, preferably $C_4$,

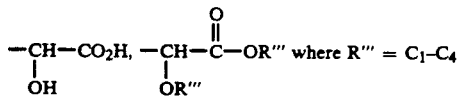 $-\underset{\underset{OH}{|}}{CH}-R''$ where $R'' = C_1-C_7$, $-\underset{\underset{OH}{|}}{CH}-CO_2H$, $-\underset{\underset{OR'''}{|}}{CH}-\overset{\overset{O}{\|}}{C}-OR'''$ where $R''' = C_1-C_4$ Other functional monomers include those containing $-CO_2H$, $-NH_2$, $-OH$,
for example $-CO_2H$:

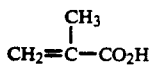 $CH_2=CH-CO_2H$     (AA)

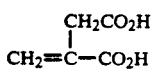 $CH_2=\underset{\underset{CH_3}{|}}{C}-CO_2H$     (MAA)

$CH_2=\underset{\underset{CH_2CO_2H}{|}}{C}-CO_2H$     (IA)

for example $-OH$:

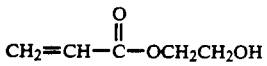 $CH_2=CH-\overset{\overset{O}{\|}}{C}-OCH_2CH_2OH$     (HEA)

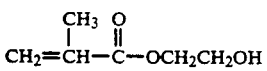 $CH_2=\underset{\underset{CH_3}{|}}{CH}-\overset{\overset{O}{\|}}{C}-OCH_2CH_2OH$     (HEMA)

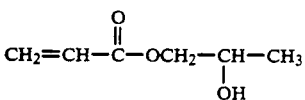 $CH_2=CH-\overset{\overset{O}{\|}}{C}-OCH_2-\underset{\underset{OH}{|}}{CH}-CH_3$     (HPA)

for example $-NH_2$:

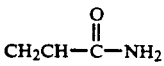 $CH_2CH-\overset{\overset{O}{\|}}{C}-NH_2$     (AM)

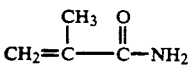 $CH_2=\underset{\underset{CH_3}{|}}{C}-\overset{\overset{O}{\|}}{C}-NH_2$     (MAM)

Of the above functional monomers, N-methylol acrylamide, N-isobutoxymethyl acrylamide and acrylic acid and preferred.

The amount of functional monomer is generally from about 0.5 to about 8 percent by weight, desirably from about 3 to about 7 percent by weight, and preferably from about 4 to about 6 percent by weight.

The copolymer formed has a Tg generally from about −10° to 60° C., desirably from about 30° C. to 50° C., and preferably about 45° C.

The emulsion polymerization is generally initiated by free radical initiators which are utilized in conventional amounts. Typical initiators can include persulfate salts such as sodium, potassium, and ammonium persulfate; hydroperoxides such as cumene hydroperoxide, paramethane hydroperoxide, and the like; organic peroxides such as benzoyl peroxide, dicumyl peroxide, and the like; and diazo compounds such as azobisisobutyronitrile, with the persulfate salts being preferred. The temperature of the polymerization reaction is generally from about 40° C. to about 85° C. and preferably from about 50° C. to about 75° C.

The amount of initiator is generally from about 0.1 to 2 per 100 parts by weight of monomer and preferably from about 0.2 to about 0.6 per 100 parts by weight of monomer. This initiator can be added at the beginning of the polymerization or it can be proportioned in over time.

Various surfactants can also be utilized. Conventional anionic surfactants known to the art as well as to the literature can be used. Generally, any suitable anionic surfactant can be used such as those set forth in McCutcheon's "Detergents and Emulsifiers," 1991, North American addition published by McCutcheon's division, MC Publishing Co., Glen Rock, N.J., USA, as well as the various subsequent additions thereof, all of which are hereby fully incorporated by reference. Various conventional soaps or detergent may be used such as sodium alkyl sulfate wherein the alkyl group has from about 8 to about 22 carbon atoms such as sodium lauryl sulfate, sodium stearyl sulfate, and the like, as well as various sodium alkyl benzene sulfonates wherein the alkyl has from about 8 to about 22 carbon atoms, such as sodium dodecyl benzene sulfonate, and the like. Additional anionic surfactants can include sulfosuccinates and disulfonated alkyl benzene derivatives having a total of from about 8 to about 22 carbon atoms. Various alkyl, aryl, or aralkyl type phosphates may also be used. The amount of surfactant is generally between 1 to 10 parts based on 100 parts of monomer, and desirably from about 1½ to 5 parts by weight based on 100 parts of monomer.

The nonionic surface active compounds of this invention are those nonionic surfactants that are generally known to the art and to the literature. The various types of nonionic surfactants may include (a) reaction products of ethylene oxide with fatty alcohols, alkylated phenols, and esters of fatty acids with carbohydrates, the long chain fatty groups containing from about 6 to about 30 carbon atoms; and (b) propylene oxide-ethylene oxide block copolymers prepared by the sequential addition of propylene oxide and ethylene oxide in either order to a residue of any organic compound containing a plurality of hydrogen atoms and having a final molecular weight of 500 or greater.

The preferred amount of ethylene oxide used in a nonionic surfactant is from about 3 to about 100 moles per mole of fatty compound. The long chain groups may be branched, unsaturated, or substituted, or can even be substituted in multiple form such as with the polyhydroxy sorbitans.

U-F resins are made from two basic materials, urea and formaldehyde. Urea is produced from the reaction of ammonia and carbon dioxide. The first reaction in U-F formation is the addition reaction in which formaldehyde reacts with the urea group to form a "methylol compound." One such compound includes dimethylol urea (DMU). The actual polymerization proceeds by a condensation reaction. The methylol group on the urea reacts with active hydrogen compounds to form long chain polymers which react to make up a three-dimensional matrix of cured resin. Generally, two methylol end groups react to form either an ether linkage or a methylene bridge between the urea molecules. Water and formaldehyde are formed as by-products, hence, this is a condensation reaction. Specific examples of U-F resins include Resimene ® (Monsanto) and others.

ADDITION REACTION

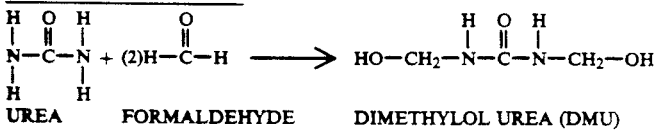

UREA    FORMALDEHYDE    DIMETHYLOL UREA (DMU)

CONDENSATION REACTIONS

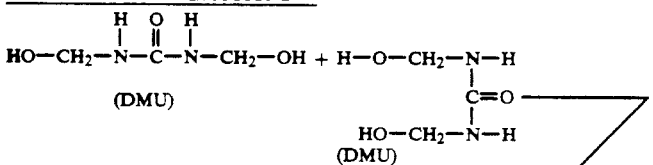

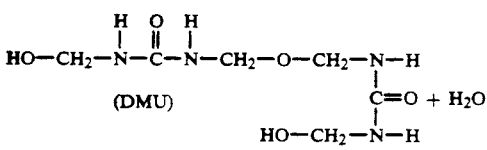

(MONOMER - ETHER LINKAGE)    (WATER)

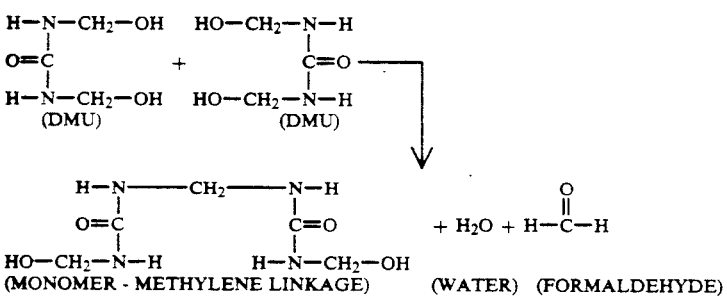

(MONOMER - METHYLENE LINKAGE)    (WATER) (FORMALDEHYDE)

Binders are used in the manufacture of glass mats for roofing applications and are generally modifications of straight U-F resins. The unmodified systems tend to be brittle resins with a high hydrophilic character. Modifications are made to U-F-binders to increase flexibility and decrease moisture sensitivity. In the U-F modifiers of this invention, methylol groups and carboxyl groups on the polymer backbone can react with the DMU groups to release water and formaldehyde to form ether linkages and methylene linkages. The relative rates of these polymer/U-F cure reactions are key to the development of good binder properties. The vinyl chloride containing polymer backbone serves to accelerate these reactions and makes the polymers of the current invention more effective as U-F modifiers than acrylic or SBR latexes.

To cure U-F binder systems on fiber glass mat, the mat, after treatment with U-F resin, is exposed to heat in curing ovens. The actual amount of heat the mat absorbs depends on the oven temperature, exposure time, and oven conduction efficiency. Conduction efficiency is determined by air flow inside the oven. Hot air forced through the mat removes water and allows heat transfer to the resin. The moisture is removed from the resin while increasing temperature and heat is applied to cure the resin and to convert the ether linkages to methylene linkages.

In the current invention, the mats were formed by mixing the two liquids, i.e. the polymer and the formaldehyde together in a conventional manner. This was done in a conventional mixer. Glass fiber material in aqueous media was placed over a sheet mold screen and a mat was formed on draining. The binder was applied to the nonwoven mat by saturation. Saturation was accomplished either by the immersion of the mat into a bath of the binder, or by pouring the binder over the non-woven mat. Once the mat was saturated, the excess binder was removed from the mat by house vacuum. This also helped assure the binder penetrated the entire mat. The mat was cured as described above.

The copolymer is incorporated into the urea formaldehyde resin either at the time of the glass mat manufacture or prior to it.

The urea formaldehyde resins that may be used are generally water based liquids and are well known to the art and literature.

The cure temperature is generally from about 130° C. to about 250° C.

This binder system can be used on a variety of wet-laid and air-laid nonwoven substrates. Typical materials include fiberglass, and mixtures of polyester and fiberglass generally known to the art and to the literature. In addition, various fibers that are infusible at the cure temperature such as carbon and nylon, may also be used.

The present invention generally relates to a copolymer that is useful as a nonwoven binder particularly in moldable applications. This binder may also be used for paper. Specifically, roofing applications such as shingles are a preferred application.

EXAMPLES

Example 1

The following example demonstrates the preparation of the copolymer emulsion of vinyl chloride, butyl acrylate, vinyl acetate, N-methylol acrylamide, N-isobutoxymethyl acrylamide, and acrylic acid typical of the present invention.

After evacuation of a majority of the air, a 55 liter pressure vessel was charged with 6.23 Kg of demineralized water followed by 110 grams of 28 percent ammonium hydroxide and 1.38 Kg of linear alkyl aromatic sulfonate emulsifier. Agitation of the vessel was begun and then the following monomers were charged; butyl acrylate (6.23 Kg), vinyl acetate (6.08 Kg), N-methylol acrylamide 48 percent (987 grams), N-isobutoxy(methyl) acrylamide (474 grams), and acrylic acid (263 grams). The premixed emulsion was agitated during the reactor preparation and polymerization. Vinyl chloride monomer (12.79 Kg) was then charged to the premix vessel.

A second 55 liter agitated pressure vessel equipped with a temperature controlled jacket was then charged with 13.1 Kg of demineralized water, 95 grams of sodium persulfate, and 1.54 Kg of preformed seed emulsion. The vessel was then evacuated and heated to 57° C. and the premix emulsion was pumped into the vessel over a period of 900 minutes. During this period the temperature of the reaction mass was maintained at 57° C. After the premix feed was completed, the reactor was held an additional 360 minutes at this temperature during which time aqueous solutions of sodium persulfate (711 grams, 7.4 percent) and sodium metabisulfite (671 grams, 2 percent) were pumped into the reactor. After which period, the emulsion was partially cooled.

After reaching a temperature of approximately 50° C., the emulsion was transferred to a third agitated pressure vessel. The temperature was maintained within a range of 40° to 50° C. while an absolute pressure of 60 to 200 mm Hg was maintained. Additional water was added (in amounts as necessary) to prevent overconcentration of the emulsion. The residual vinyl chloride monomer was stripped from the emulsion over a period of 200 to 600 minutes. The resulting latex was cooled and filtered to remove coagulum.

Example 2

An emulsion polymer was produced by charging a 3400 cc jacketed and agitated pressure vessel with 1036 grams demineralized water, 77.8 grams of preformed seed emulsion, and 6.2 grams of sodium persulfate. The vessel was heated to 57° C. In five separate streams, monomer and emulsifier solutions were then continuously fed into the vessel. The emulsifier stream consisted of 143 grams of a nonionic ethoxylated octylphenol, 12 grams of a phosphated linear alkyl ethoxylate, and 15.9 grams acrylic acid mixed with 488 grams of demineralized water. Second and third streams consisted of 690 grams and 335 grams of vinyl chloride and butyl acrylate respectively. The fourth stream contained 56 grams of 48 percent N-methylol acrylamide and 22 grams of demineralized water. The fifth stream consisted of 326 grams of vinyl acetate mixed with 127 grams of N-isobutoxy (methyl) acrylamide. Feeds were maintained continuously over a period of 900 minutes while the temperature was controlled at 57° C. The emulsion was held an additional 300 minutes before cooling.

The cooled emulsion was then transferred to a 5000 ml flask and placed in a constant temperature bath. The temperature was maintained at 40° to 50° C. and the pressure was reduced to volatilize unreacted vinyl chloride monomer. The stripped emulsion was filtered and the pH adjusted with ammonium hydroxide.

In a similar manner using the same procedure and equipment, the following emulsions were also prepared as in Example 1.

TABLE I

| Kg (Charged) | VCl | BA | VA | NMA (48%) | AA | Aromatic Sulfonate Emulsifier | Octylphenoxypoly (ethyleneoxy) ethanol | Linear Alkyl Phosphate Ester Ethoxylate |
|---|---|---|---|---|---|---|---|---|
| A | 12.0 | 6.29 | 6.39 | 0.987 | 0.263 | 1.97 | — | — |
| B | 13.0 | 6.47 | 6.08 | 0.987 | 0.263 | — | 2.63 | 0.184 |
| C | 11.6 | 6.08 | 7.89 | 0.987 | 0.263 | — | 2.63 | 0.184 |
| D | 12.2 | 5.96 | 6.06 | 1.82 | 0.250 | 1.87 | — | — |

TABLE II

| Sample Latex | Dry Tensile (lbs/in) | Wet Tensile (lbs/in) | Hot Tensile (lbs/in) | Elm Tear (g) | Blend Stability |
|---|---|---|---|---|---|
| Typical acrylic | 38.8 | 35.2 | 26.5 | 205 | Good |
| Typical SBR | 40.4 | 38.3 | 30.2 | 221 | Poor |
| A | 34.2 | 29.3 | 26.7 | 252 | Good |
| B | 35.6 | 29.8 | 28.2 | 244 | Good |
| C | 32.7 | 27.3 | 22.8 | 232 | Good |
| D | 41.6 | 36.5 | 31.4 | 266 | Good |
| Inventive Polymer | 42.3 | 42.0 | 32.5 | 254 | Good |

The samples tested were laboratory handsheets made with ¼" glass fibers at a weight of 1.7 pounds per 100 square feet bound with U-F/latex blends in a 9:1 ratio. All were cured for 90 seconds at 200° C. The binder added to the mat comprised 20 percent of the total mat weight.
All tensile values* are in lbs/in. The wet tensiles were run after soaking the samples for 10 minutes in 180° F. water. The hot tensiles were run on samples at 375° F. after 3 minutes. The Elmendorf Tear was run on a single ply.
*The instrument used was a Thwing-Albert Tester. Samples were 1" × 6"; gap space was 4"; crosshead speed was 1"/min.

TABLE III

| Sample Latex | Dry Tensile (lbs/in) | Wet Tensile (lbs/in) | Hot Tensile (lbs/in) | Elm Tear (g) | Blend Stability |
|---|---|---|---|---|---|
| Resin 1 with: | | | | | |
| No Latex | 23.1 | 18.6 | | 221 | — |
| 10% Inventive Polymer | 44.6 | 34.3 | | 263 | Good |
| 10% Typical Acrylic | 34.8 | 20.6 | | 205 | Good |
| 10% Typical SBR | 38.8 | 32.5 | | 234 | Poor |
| Resin 2 with: | | | | | |
| No Latex | 34.2 | 25.7 | | 251 | — |
| 10% Inventive Polymer | 42.4 | 37.2 | | 301 | Good |
| 10% Typical Acrylic | 34.8 | 27.1 | | 270 | Good |

TABLE III-continued

| Sample Latex | Dry Tensile (lbs/in) | Wet Tensile (lbs/in) | Hot Tensile (lbs/in) | Elm Tear (g) | Blend Stability |
|---|---|---|---|---|---|
| 10% Typical SBR | 38.1 | 36.2 | | 265 | Poor |

This Table used 2 commercial U-F resins (from different suppliers) commonly found in shingle mats.
The samples tested were laboratory handsheets made with ¼" glass fibers at a weight of 1.7 pounds per 100 square feet bound with U-F/latex blends in a 9:1 ratio. All were cured for 90 seconds at 200° C. The binder added to the mat comprised 20 percent of the total mat weight.
All tensile values* are in lbs/in. The wet tensiles were run after soaking the samples for 10 minutes in 180° F. water. The hot tensiles were run on samples at 375° F. after 3 minutes. The Elmendorf Tear was run on a single ply.
*The instrument used was a Thwing-Albert Tester. Samples were 1" × 6"; gap space was 4"; crosshead speed was 1"/min.

TABLE IV

Kinetic Data on Cure of Inventive Polymer vs. Typical Acrylic

| Sample | Onset of Cure Rxn. (°C.)* | Time to 50% Cure (sec)** | Time to 95% Cure (sec)** |
|---|---|---|---|
| Resin 1 + 10% Inventive Polymer | 120 | 49 | 145 |
| Resin 1 + 10% Acrylic | 127 | 68 | 167 |
| Resin 2 + 10% Inventive Polymer | 120 | 65 | 136 |
| Resin 2 + 10% Acrylic | 128 | 85 | 157 |

*Measured by Mettler Differential Scanning Calorimetry (DSC). Heated under controlled conditions, Heat Rate = 5° C./min.
**This data based on oven curing for 3 minutes at 200° C. (calculated).

Table II shows a comparison between the properties obtained using a typical acrylic latex, a typical SBR latex, and various blends, along with that of the inventive polymer. This Table demonstrates the unexpected results obtained by using the inventive method.

Table III further demonstrates physical properties obtained using the inventive polymer in combination with urea formaldehyde resins. The inventive polymer shows unexpectedly better tear properties and blend stability.

Table IV shows the kinetic data on cure of the inventive polymer. This data demonstrates the interactional dynamics between the polymer and the U-F resin during the drying and curing stages of the binder.

TEST METHODS

Hand Sheet Casting Techniques

1. A high-shear turbine mixing head was adjusted to a speed with a maximum of 1,450 rpm under a no load condition.

2. Water was added to the vessel and the height of the mixing blade was adjusted so that the top of the blade is approximately ¼ to ½ inch below the water's surface.

3. Viscosity modifiers and dispersing agents were added to the vessel. Approximately 8 grams of the chopped fibers were added to the mixing vessel and mixed for approximately 2 minutes.

4. The glass fiber fabric was formed over a sheet mold screen. The slurry was poured into the sheet mold and mixed thoroughly with the agitator. The agitator was then removed and the sheet mold drained.

5. The mat was removed from the sheet mold by pulling with even pressure. The carrier wire and mat were placed onto a glass fiber screen melted on a frame. Excess water was removed by vacuuming the under side of the screen.

6. Binder was applied to the mat by contacting the bottom of the screen with the graphic roll applicator and the screen was moved in a direction opposite to the roll's rotation.

7. The mat was vacuumed from the bottom of the screen evenly to ensure proper binder add-on. The sheet was rotated 90° and the vacuuming process was repeated.

8. The mat was turned over onto a ¼ inch mesh steel wire screen mounted on a wood frame. The carrier web was removed. The mat and screen were placed on an electric drying plate until dry. The screen was then cured. Cure time and temperature were dependent on the binder system used. The mats were tested according to TAPPI standard procedures. Tensile strength was measured using 5.1 centimeter jaws and an Instron tensile tester. Wet tensile was measured after 24 hours of soaking at TAPPI standard conditions. Fold was determined on an MIT fold tester as a measure of the web's ability to bend and withstand damage during movement on a roof.

While in accordance with the Patent Statutes, the best mode and preferred embodiment has been set forth, the scope of the invention is not limited thereto, but rather by the scope of the attached claims.

What is claimed is:

1. A nonwoven glass mat binder for use in forming a roofing substrate formed from a blend of urea formaldehyde resin and a copolymer, said urea formaldehyde resin and said copolymer being present in a weight ratio of about 9:1 and said copolymer being made from at least:
   a) a vinyl chloride monomer;
   b) a functional monomer, for crosslinking the vinyl chloride polymer and/or reacting with the urea formaldehyde in an amount of from about 0.5 to about 8% by weight; and
   c) an effective amount of a softening monomer, selected from the group consisting essentially of acrylates, olefins and vinyl esters in an amount of from about 9.5 to about 70 percent by weight, to result in suitable wet and dry tensile strength and resulting in a mat having increased flexibility.

2. A nonwoven binder formed from a blend of urea formaldehyde resin and a copolymer as in claim 1, wherein said vinyl chloride monomer is present in an amount of from about 20 to about 90 percent by weight.

3. A nonwoven glass mat binder for use in forming a roofing substrate formed from a blend of urea formaldehyde resin and a copolymer made from at least:
   a) 35 to 70 percent by weight vinyl chloride monomer;
   b) a functional monomer, for crosslinking the vinyl chloride polymer and/or reacting with the urea formaldehyde in an amount of from about 0.5 to about 8 percent by weight; and
   c) an effective amount of a softening monomer, selected from the group consisting essentially of acrylates, olefins and vinyl esters in an amount of from bout 9.5 to 70 percent by weight, to result in suitable wet and dry tensile strength, and which results in a mat having increased flexibility.

4. A nonwoven binder formed from a blend of urea formaldehyde resin and a copolymer as in claim 3, wherein said softening monomer is present in an amount of from about 30 to about 60 percent by weight.

5. A nonwoven binder formed from a blend of urea formaldehyde resin and a copolymer as in claim 1, wherein said functional monomer is present in an amount of 3 to 7 percent by weight.

6. A nonwoven glass mat binder for use in forming a roofing substrate formed from a blend of urea formaldehyde resin and a copolymer comprising:
   a) 45 to 55 percent by weight vinyl chloride monomer;
   b) a functional monomer, for crosslinking the vinyl chloride polymer and/or reacting with the urea formaldehyde in an amount of from about 0.5 to about 8 percent by weight; and
   c) an effective amount of a softening monomer, selected from the group consisting essentially of acrylates, olefins and vinyl esters in an amount of from bout 9.5 to 70 percent by weight, to result in suitable wet and dry tensile strength, and which results in a mat having increased flexibility.

7. A nonwoven binder formed from a blend of urea formaldehyde resin and a copolymer as in claim 6, wherein said softening monomer is present in an amount of from about 40 to about 50 percent by weight.

8. A nonwoven binder formed from a blend of urea formaldehyde resin and a copolymer as in claim 7, wherein said functional monomer is present in an amount of from about 4 to about 6 percent by weight.

9. A nonwoven binder formed from a blend of urea formaldehyde resin and a copolymer as in claim 1, wherein said functional monomer comprises N-methylol acrylamide, N-isobutoxymethyl acrylamide, acrylic acid or mixtures thereof.

10. A nonwoven binder formed from a blend of urea formaldehyde resin and a copolymer as in claim 1, wherein said softening monomer comprises butyl acrylate, vinyl acetate or mixtures thereof.

11. A nonwoven binder formed from a blend of urea formaldehyde resin and a copolymer as in claim 3, wherein said functional monomer comprises N-methylol acrylamide, N-isobutoxymethyl acrylamide, acrylic acid or mixtures thereof.

12. A nonwoven binder formed from a blend of urea formaldehyde resin and a copolymer as in claim 3, wherein said softening monomer comprises butyl acrylate, vinyl acetate or mixtures thereof.

13. A nonwoven binder formed from a blend of urea formaldehyde resin and a copolymer as in claim 6, wherein said functional monomer comprises N-methylol acrylamide, N-isobutoxymethyl acrylamide, acrylic acid or mixtures thereof.

14. A nonwoven binder formed from a blend of urea formaldehyde resin and a copolymer as in claim 6, wherein said softening monomer comprises butyl acrylate, vinyl acetate or mixtures thereof.

15. A roofing substrate formed from a non-woven binder as in claim 1.

16. A roofing substrate formed from a non-woven binder as in claim 3.

17. A roofing substrate formed from a non-woven binder as in claim 6.

* * * * *